(12) United States Patent
Liu

(10) Patent No.: US 6,227,632 B1
(45) Date of Patent: May 8, 2001

(54) DEVICE RACK AND COMPUTER MAINFRAME HOUSING ARRANGEMENT

(75) Inventor: Morgan Chih Liu, Taoyuan Hsien (TW)

(73) Assignee: Enlight Corporation, Taoyuan Hsien (TW)

(*) Notice: Subject to any disclaimer, the term of this patent is extended or adjusted under 35 U.S.C. 154(b) by 0 days.

(21) Appl. No.: 09/572,066

(22) Filed: May 17, 2000

(51) Int. Cl.⁷ .................................................. A47B 81/06
(52) U.S. Cl. .......................................... 312/223.2; 361/685
(58) Field of Search ............................... 312/223.1, 223.2, 312/270.1, 270.2, 270.3, 310, 309, 311, 322, 321.5; 361/724, 725, 727, 683, 684, 685; 364/708.1

(56) References Cited

U.S. PATENT DOCUMENTS

| | | | |
|---|---|---|---|
| 3,743,374 | * 7/1973 | Glass | 312/309 |
| 5,572,402 | * 11/1996 | Jeong | 361/685 |
| 5,755,497 | * 5/1998 | Chang | 312/223.2 |
| 5,774,337 | * 6/1998 | Lee et al. | 361/725 |

* cited by examiner

Primary Examiner—James O. Hansen
(74) Attorney, Agent, or Firm—Dougherty & Troxell

(57) ABSTRACT

A device rack and computer mainframe housing arrangement includes a computer mainframe housing having a front receiving hole, and a device rack pivoted to the computer housing and moved into and out of the front receiving hole between the close position and the open position, the device rack having a shell of U-shaped profile defining a plurality of vertical tracks, a front panel covered on the shell, a plurality of computer peripheral apparatus holders respectively inserted into the vertical tracks in the shell, and a springy retaining hook mounted in an insertion hole on the front panel and releasably hooked on an inside flange in the front receiving hole in the computer mainframe housing to secure the device rack in the close position.

4 Claims, 6 Drawing Sheets

DEVICE RACK AND COMPUTER MAINFRAME HOUSING ARRANGEMENT

BACKGROUND OF THE INVENTION

The present invention relates to personal computers, and more specifically to a device rack and computer mainframe housing arrangement for a computer, which comprises a device rack pivoted to the mainframe housing of a computer and movable into and out of a front receiving hole in the mainframe housing, which device rack having a plurality of detachable computer peripheral apparatus holders for holding a respective computer peripheral apparatus.

Inside the housing of a computer mainframe, device racks are fixedly secured in position for holding peripheral apparatus, for example, disk drives. These device racks need much installation space. Further, because these device racks are fixedly provided inside the housing of the computer mainframe, it is difficult to access installed peripheral apparatus for a maintenance work.

SUMMARY OF THE INVENTION

According to one aspect of the present invention, the device rack and computer mainframe housing arrangement comprises a computer mainframe housing having a front receiving hole, and a device rack pivoted to the computer housing and movable into and out of the front receiving hole between the close position and the open position, the device rack having a shell of U-shaped profile defining a plurality of vertical tracks, a front panel mounted on the shell, and a plurality of computer peripheral apparatus holders respectively inserted into the vertical tracks in the shell. According to another aspect of the present invention, the device rack and computer mainframe housing arrangement further comprises a springy retaining hook mounted in an insertion hole on the front panel and releasably hooked on an inside flange in the front receiving hole in the computer mainframe housing to secure the device rack in the close position. According to still another aspect of the present invention, the shell comprises a plurality of retaining holes above the vertical tracks thereof; the computer peripheral apparatus holders each comprise two spring plates at the respective side rails for engagement with the retaining holes on the shell, the spring plates each having a free end terminating in a finger strip, and a middle part forming a retaining portion for engagement with one retaining hole on the shell.

DETAILED DESCRIPTION OF THE PREFERRED EMBODIMENT

Figure 1:
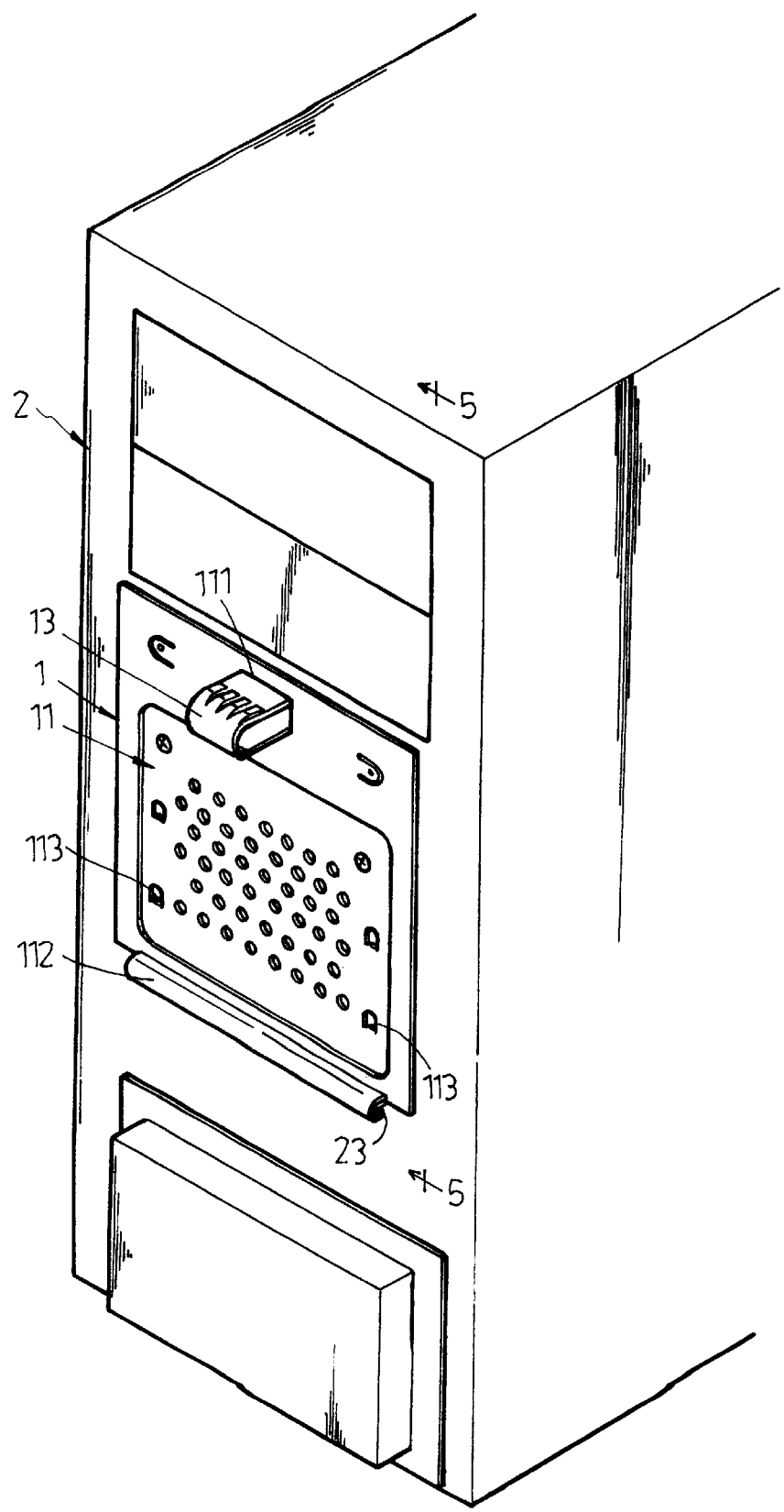
FIG. 1 illustrates a device rack installed in a computer housing according to the present invention.
Figure 2:
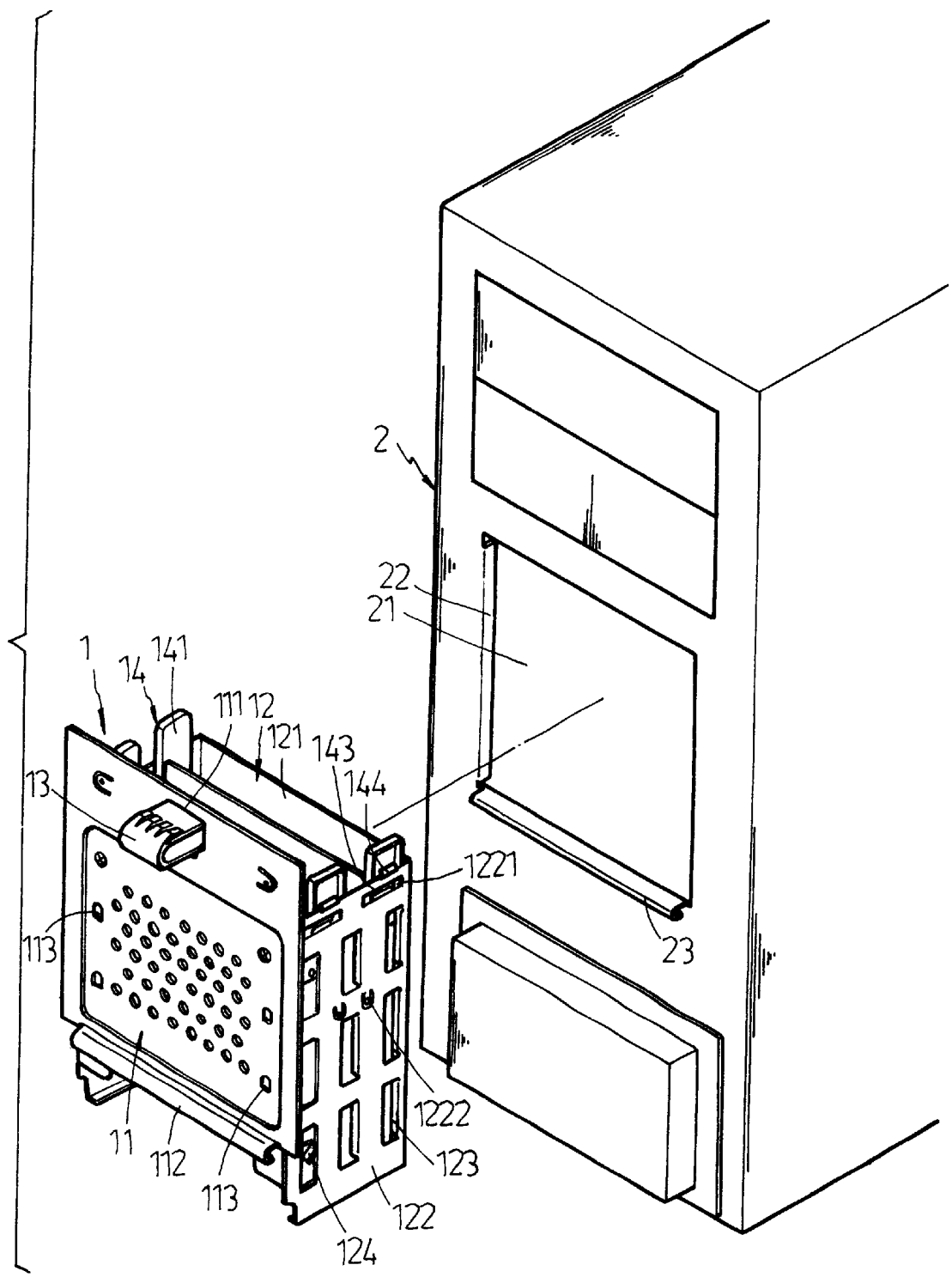
FIG. 2 illustrates the device rack taken away from the computer housing according to the present invention.
Figure 3:
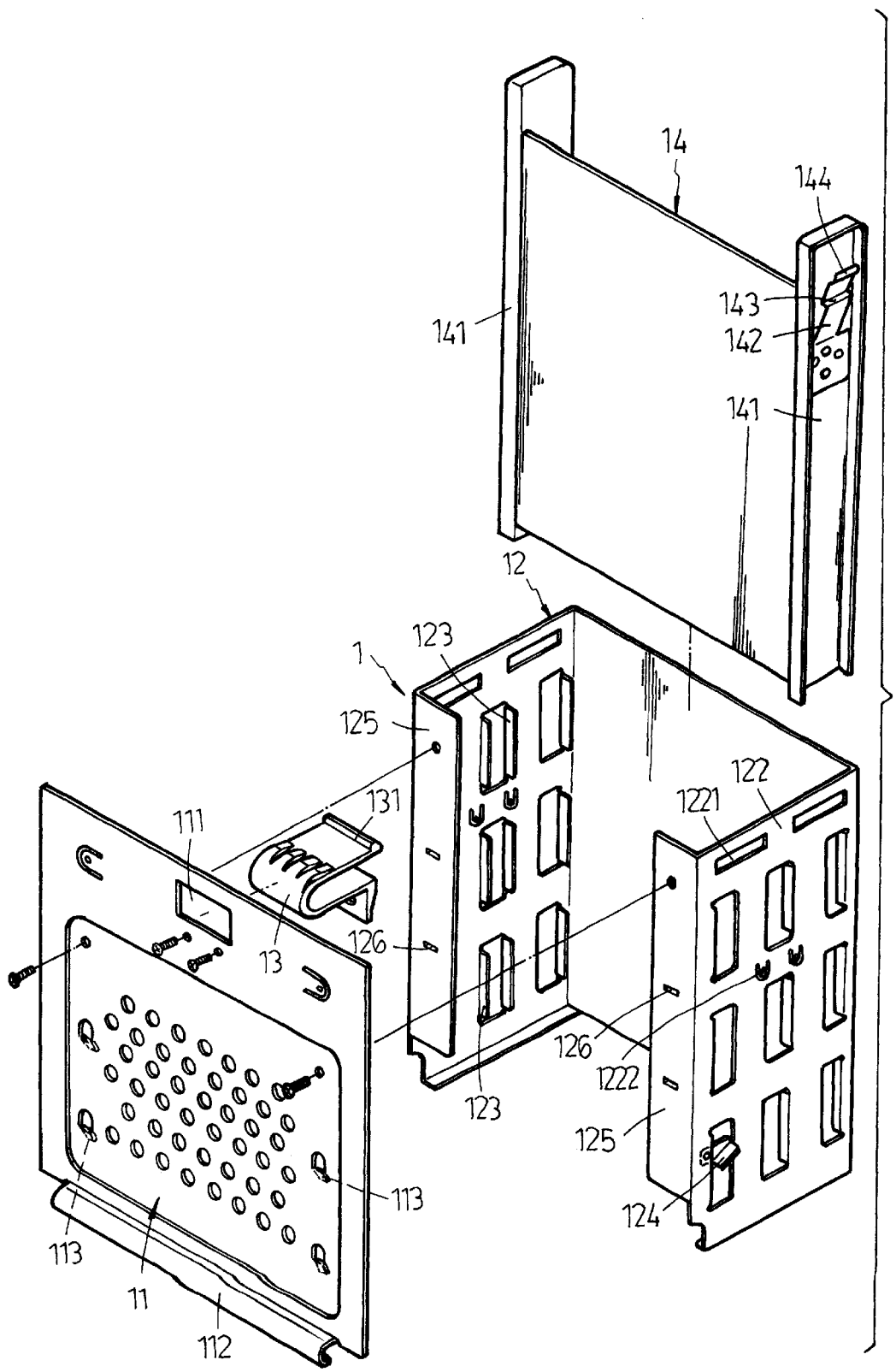
FIG. 3 is an exploded view of the device rack according to the present invention.

Referring to FIGS. 1 through 3, a device rack 1 is mounted in a rectangular receiving hole 21 in a computer mainframe housing 2. The device rack 1 is comprised of a front panel 11, a shell 12, a springy retaining hook 13, and a plurality of disk drive holders 14. The computer mainframe housing 2 comprises three inside friction flanges 22 respectively disposed along the top and two opposite lateral sides of the receiving hole 21, and an outside coupling flange 23 disposed along the bottom side of the receiving hole 21. The shell 12 comprises a back side wall 121, two lateral side walls 122 respectively raised from two opposite lateral sides of the back side wall 121 at right angles, two mounting flanges 125 respectively inwardly raised from the lateral side walls 122 at right angles and arranged in parallel to the back side wall 121, pairs of vertical tracks 123 symmetrically formed integral with the lateral side walls 122 on the inside, a plurality of retaining holes 1221 respectively formed on the lateral side walls 122 above each vertical track 123, two stop rods 124 respectively raised from the lateral side walls 122 adjacent to the mounting flanges 125 to limit the outward pivoting movement of the shell 12 with the front panel 11 (this will be described further), and a plurality of raised portions 1222 respectively provided at the lateral side walls 122 on the outside for rubbing against the inside friction flange 22 of the computer mainframe housing 2 to buffer the movement of the device rack 1 when the device rack 1 is moved into or out of the receiving hole 21 in the computer mainframe housing 2. The front panel 11 comprises an insertion hole 111, formed in a middle portion near the top side thereof, which receives the springy retaining hook 13, a bottom coupling flange 112 coupled to the outside coupling flange 23 at the computer mainframe housing 2 for enabling the front panel 11 to be moved about the outside coupling flange 23 between two positions, namely, the close position and the open position, and a plurality of back hooks 113 respectively hooked on the hook holes 126 at the mounting flanges 125 of the shell 1. The disk drive holders 14 are respectively inserted into the pairs of vertical tracks 123 between the two opposite lateral side walls 122 of the shell 12 to hold a respective disk drive in the device rack 1, each comprising two vertical side rails 141 inserted into one pair of vertical tracks 123 between the lateral side walls 122 of the shell 12, and two spring plates 142 respectively raised from the side rails 141 near the top. The spring plates 142 each have a free end terminating in a finger strip 144, and a retaining portion 143 disposed on the middle for engagement with one retaining hole 1221 on one lateral side wall 122 of the shell 12. The springy retaining hook 13 is inserted through the insertion hole 111 on the front panel 11, having a fixed end fixedly fastened to the front panel 11 by, for example, screws, and a free end terminating in a hooked portion 131 for hooking on the inside friction flange 22 at the top side of the receiving hole 21 in the computer mainframe housing 2. Further, screws may be used to fixedly secure the front panel 11 to the mounting flanges 125 of the shell 12 after engagement of the back hooks 113 of the front panel 11 into the hook holes 126 on the mounting flanges 125 of the shell 12.

Figure 4:
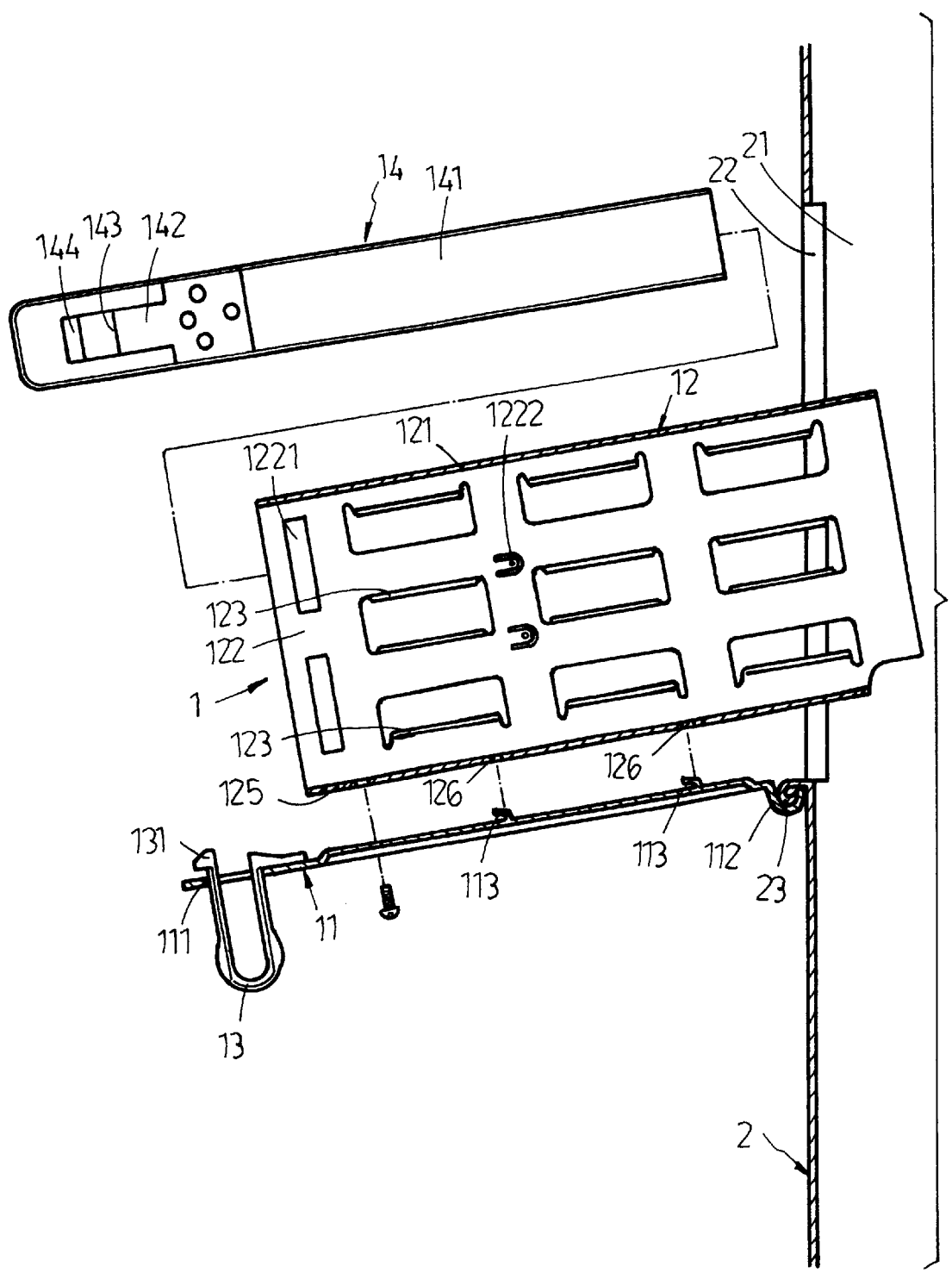
FIG. 4 is an assembly view of the present invention.
Figure 5:
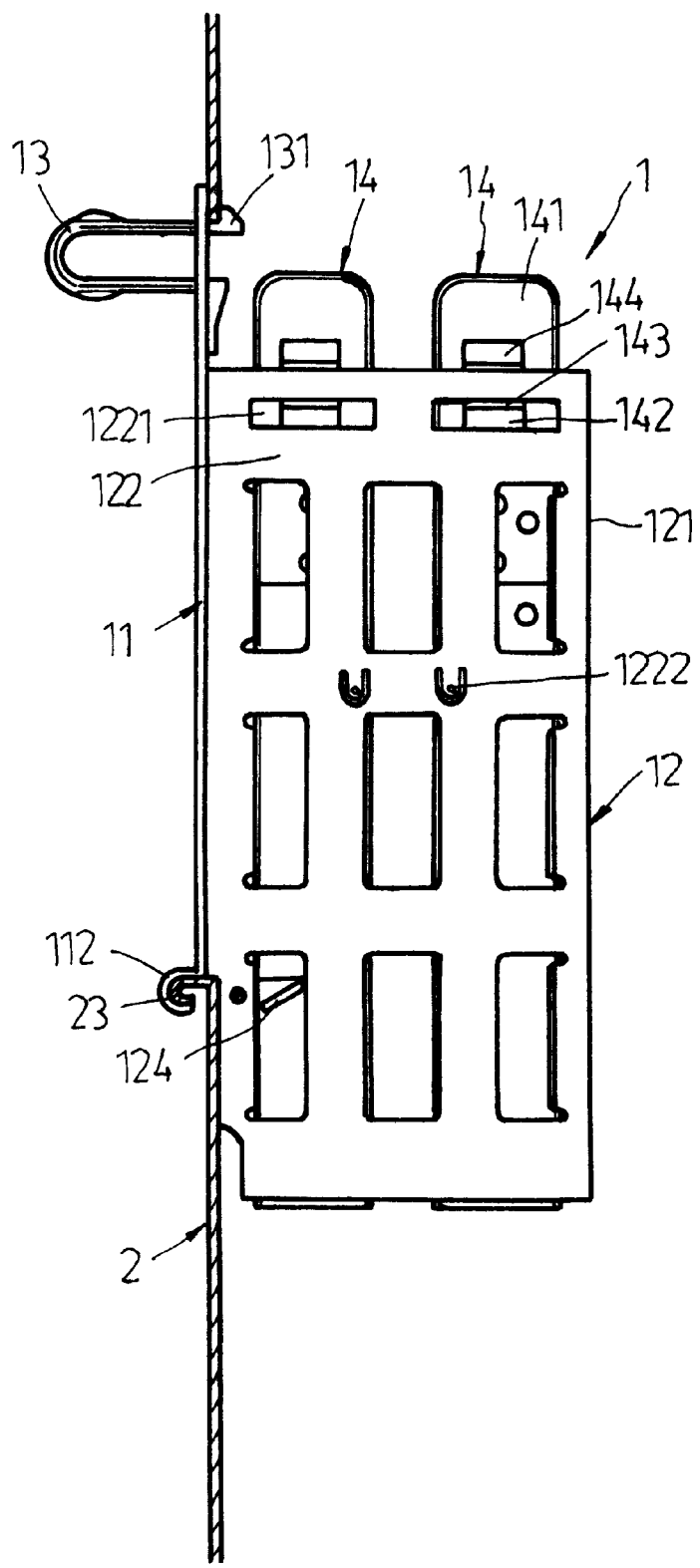
FIG. 5 is a sectional view taken along line 5—5 of FIG. 1.
Figure 6:
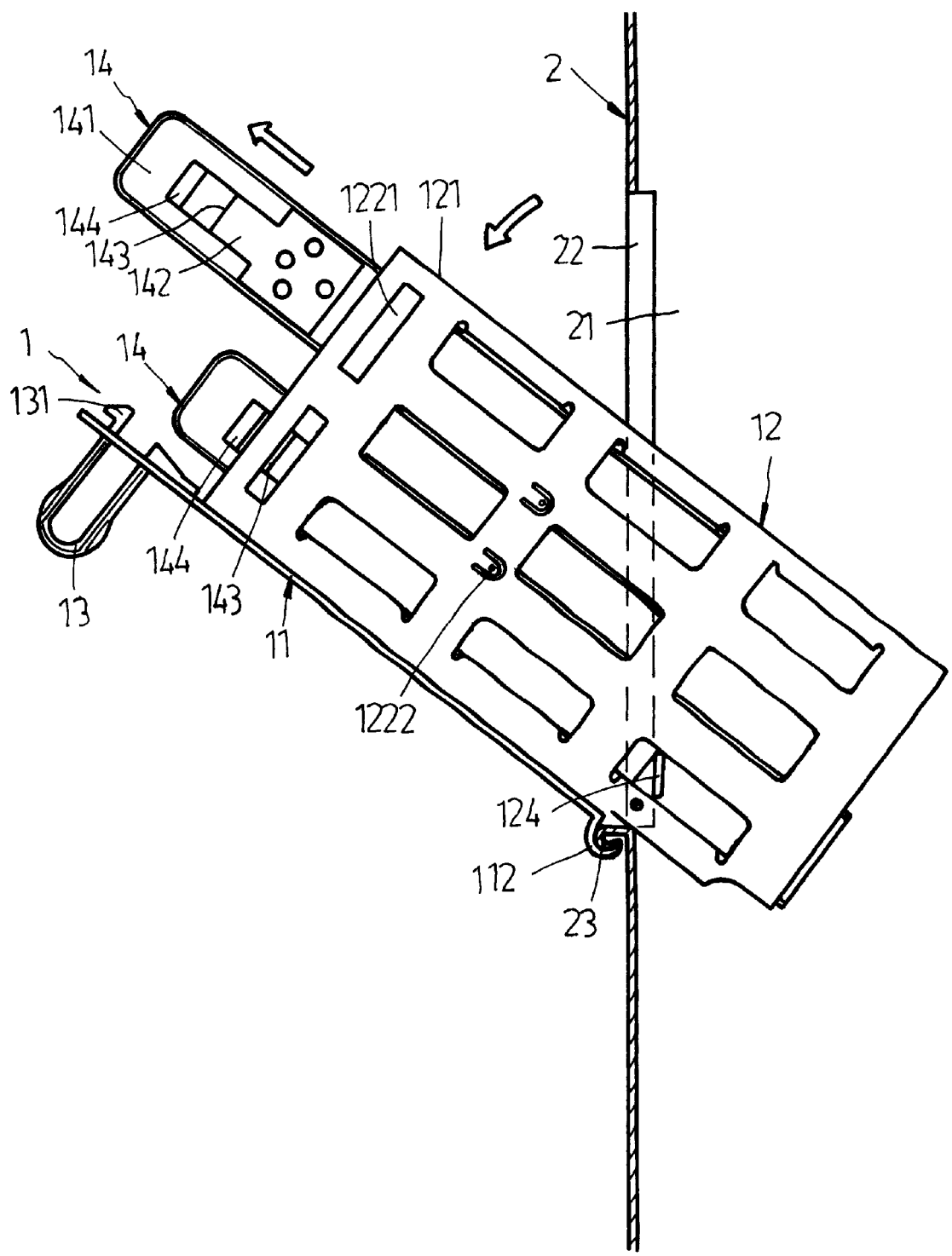
FIG. 6 is a schematic drawing showing the device rack moved out of the computer housing according to the present invention.

Referring to FIGS. 4 through 6 and FIG. 1 again, when opening the device rack 1, the springy retaining hook 13 is depressed to disengage the hooked portion 131 from the inside friction flange 22 at the top side of the receiving hole 21 in the computer mainframe housing 2 and then pulled outwards to move the device rack 1 about the outside coupling flange 23, enabling the device rack 1 to be moved out of the computer mainframe housing 2 from the close position shown in FIG. 5 to the open position shown in FIG. 6. When opened, the stop rods 124 are respectively stopped at the inside friction flanges 22 at the two opposite lateral sides of the receiving hole 21 to support the device rack 1 in the open position. By operating the finger strip 144 of each spring plate 142, the retaining portion 143 of each spring plate 142 is disengaged from the corresponding retaining hole 1221 on the corresponding lateral side wall 122 of the shell 12, enabling the respective disk drive holder 14 to be taken out of the shell 12.

While only one embodiment of the present invention has been shown and described, it will be understood that various modifications and changes could be made thereunto without departing from the spirit and scope of the invention disclosed.

What the invention claimed is:

1. A device rack and computer mainframe housing arrangement comprising:

a computer mainframe housing, said computer mainframe housing comprising a receiving hole at a front side wall thereof, three inside friction flanges respectively disposed along top and two opposite lateral sides of said receiving hole, and an outside coupling flange disposed along a bottom side of said receiving hole; and a device rack pivoted to said computer mainframe housing and movable into and out of the receiving hole in said computer mainframe housing, said device rack comprising a shell, a front panel mounted on said shell, a springy retaining hook, and a plurality of computer peripheral apparatus holders respectively mounted in said shell to hold a respective computer peripheral apparatus, said front panel comprising a bottom coupling flange pivoted to the outside coupling flange at said computer mainframe housing, a top insertion hole formed in a middle portion near a top side of said front panel and a plurality of back hooks, said shell comprising pairs of vertical sliding tracks symmetrically formed on two opposite lateral side walls thereof, and a plurality of hook holes respectively formed on two front mounting flanges thereof and engageable with the back hooks of said front panel, said computer peripheral apparatus holders each having two side rails respectively inserted into the pairs of vertical tracks in said shell, said springy retaining hook being mounted in the insertion hole on said front panel for locking said device rack to said computer mainframe housing after said device rack having been moved into the receiving hole.

2. The device rack and computer mainframe housing arrangement of claim 1 wherein said springy retaining hook has a fixed end fixedly fastened to said front panel, and a free end terminating in a hooked portion engageable with the inside friction flange at the top side of the receiving hole in said computer mainframe housing.

3. The device rack and computer mainframe housing arrangement of claim 1 wherein said shell comprises two stop rods at two opposite sides, which contact the inside friction flanges at the two opposite lateral sides of the receiving hole in said computer mainframe housing to stop outward pivoting movement of said device rack when said device rack is moved out of the receiving hole in said computer mainframe housing.

4. The device rack and computer mainframe housing arrangement of claim 1 wherein said shell comprises a plurality of retaining holes above the vertical tracks thereof; said computer peripheral apparatus holders each comprise two spring plates at the respective side rails for engagement with the retaining holes on said shell, said spring plates each having a free end terminating in a finger strip, and a middle part forming a retaining portion for engagement with one retaining hole on said shell.

* * * * *